(12) United States Patent
Schönke et al.

(10) Patent No.: US 11,916,499 B2
(45) Date of Patent: Feb. 27, 2024

(54) METHOD FOR IDENTIFYING A CARRIAGE OF A LINEAR TRANSPORT SYSTEM

(71) Applicant: Beckhoff Automation GmbH, Verl (DE)

(72) Inventors: Tobias Schönke, Bielefeld (DE); Marco Grabowski, Bielefeld (DE); Jan Achterberg, Duisburg (DE); Manuel Bettenworth, Gütersloh (DE); Uwe Prüssmeier, Lemgo (DE)

(73) Assignee: Beckhoff Automation GmbH, Verl (DE)

( * ) Notice: Subject to any disclaimer, the term of this patent is extended or adjusted under 35 U.S.C. 154(b) by 192 days.

(21) Appl. No.: 17/165,475

(22) Filed: Feb. 2, 2021

(65) Prior Publication Data

US 2021/0159834 A1 May 27, 2021

Related U.S. Application Data

(63) Continuation of application No. PCT/EP2019/069518, filed on Jul. 19, 2019.

(30) Foreign Application Priority Data

Aug. 2, 2018 (DE) ..................... 10 2018 118 814.5

(51) Int. Cl.
*H02P 25/064* (2016.01)
*H02K 11/215* (2016.01)
(Continued)

(52) U.S. Cl.
CPC ............ *H02P 25/064* (2016.02); *B65G 54/02* (2013.01); *H02K 11/215* (2016.01); *H02K 41/031* (2013.01)

(58) Field of Classification Search
CPC .. H02P 25/064; H02K 11/215; H02K 41/031; B65G 54/02
See application file for complete search history.

(56) References Cited

U.S. PATENT DOCUMENTS 4,825,773 A 5/1989 Morishita et al.
4,838,172 A 6/1989 Morishita et al.
(Continued)

FOREIGN PATENT DOCUMENTS

DE 10261659 A1 7/2004
DE 102011004348 A1 8/2012
(Continued)

OTHER PUBLICATIONS

Examination Report dated Apr. 7, 2019 in connection with German patent application No. DE 10 2018 118 814.5, 18 pages including English translation.
(Continued)

*Primary Examiner* — Zoheb S Imtiaz
(74) *Attorney, Agent, or Firm* — Dorsey & Whitney LLP

(57) ABSTRACT

A linear transport system comprises a first carriage and a second carriage, a linear motor for driving the first carriage and the second carriage and a guide rail. The linear motor comprises a stator and a first and a second rotor. The stator has a plurality of drive coils that are arranged along the guide rail individual motor modules comprise a plurality of drive coils. The first rotor is arranged on the first carriage and the second rotor is arranged on the second carriage. The first carriage has a first magnetic field generator. The second carriage has a second magnetic field generator. The first magnetic field generator differs from the second magnetic field generator at least in terms of its magnetic vector field, wherein the magnetic fields of the magnetic field generators are detected to identify the corresponding carriage.

14 Claims, 8 Drawing Sheets

(51) Int. Cl.
*B65G 54/02* (2006.01)
*H02K 41/03* (2006.01)

(56) References Cited

U.S. PATENT DOCUMENTS

| | | | |
|---|---|---|---|
| 6,191,507 | B1 | 2/2001 | Peltier et al. |
| RE39,747 | E | 7/2007 | Peltier et al. |
| 9,705,436 | B2 | 7/2017 | Fedigan et al. |
| 10,403,525 | B2 * | 9/2019 | Nishino ........... G05B 19/41865 |
| 10,447,186 | B2 | 10/2019 | Fedigan et al. |
| 2002/0079254 | A1 | 6/2002 | Soldavini et al. |
| 2002/0180279 | A1 | 12/2002 | Faizullabhoy et al. |
| 2003/0230941 | A1 | 12/2003 | Jacobs |
| 2004/0016360 | A1 | 1/2004 | Tent |
| 2006/0071577 | A1 | 4/2006 | Takeuchi |
| 2006/0119215 | A1 | 6/2006 | Bales et al. |
| 2008/0088188 | A1 | 4/2008 | Busch |
| 2009/0033169 | A1 | 2/2009 | Takeuchi |
| 2013/0313072 | A1 * | 11/2013 | van de Loecht ....... B65G 54/02 198/464.1 |
| 2015/0028098 | A1 | 1/2015 | Kleinikkink et al. |
| 2015/0048693 | A1 | 2/2015 | Prussmeier |
| 2015/0364965 | A1 | 12/2015 | Fernandes Goncalves et al. |
| 2017/0117829 | A1 | 4/2017 | Yamamoto |
| 2017/0199506 | A1 | 7/2017 | Jones et al. |
| 2018/0159416 | A1 | 6/2018 | Julen et al. |
| 2018/0350648 | A1 | 12/2018 | Klesen |
| 2019/0214896 | A1 | 7/2019 | Rauma |
| 2023/0039298 | A1 | 2/2023 | Keppner |
| 2023/0170779 | A1 | 6/2023 | McDonald et al. |

FOREIGN PATENT DOCUMENTS

| | | |
|---|---|---|
| DE | 102012204917 A1 | 10/2013 |
| DE | 102013211441 A1 | 12/2014 |
| DE | 102014117200 A1 | 5/2016 |
| DE | 102015102236 A1 | 8/2016 |
| DE | 102016120464 A1 | 4/2018 |
| EP | 0052346 A2 | 5/1982 |
| EP | 0278532 A2 | 8/1988 |
| EP | 0298194 A2 | 1/1989 |
| EP | 0299137 A1 | 1/1989 |
| EP | 0300123 A1 | 1/1989 |
| EP | 0300124 A1 | 1/1989 |
| EP | 0300125 A1 | 1/1989 |
| EP | 0301164 A2 | 2/1989 |
| EP | 2104209 A2 | 9/2009 |
| EP | 3044133 B1 | 4/2018 |
| EP | 3460963 A1 | 3/2019 |
| EP | 3719980 A1 | 10/2020 |
| NL | 8401073 A | 11/1985 |
| WO | 2017096380 A1 | 6/2017 |
| WO | 2019007202 A1 | 1/2019 |
| WO | 2022133463 A1 | 6/2022 |
| WO | 2023035052 A1 | 3/2023 |

OTHER PUBLICATIONS

International Search Report and Written Opinion dated Sep. 16, 2019 in connection with International Patent Application No. PCT/EP2019/069518, 34 pages including English translation.

"EtherCAT—the Ethernet Fieldbus," EtherCAT Technology Group, Nov. 2012, 21 pages.

Office Action dated Jul. 22, 2023 in connection with Chinese patent application No. 201980064734.7, 9 pages Including English translation.

Nilsson, Henry et al. "Path planning algorithm for levitating planar motion system," Lund University, Department of Automatic Control, Thesis, 2022, Sweden.

* cited by examiner

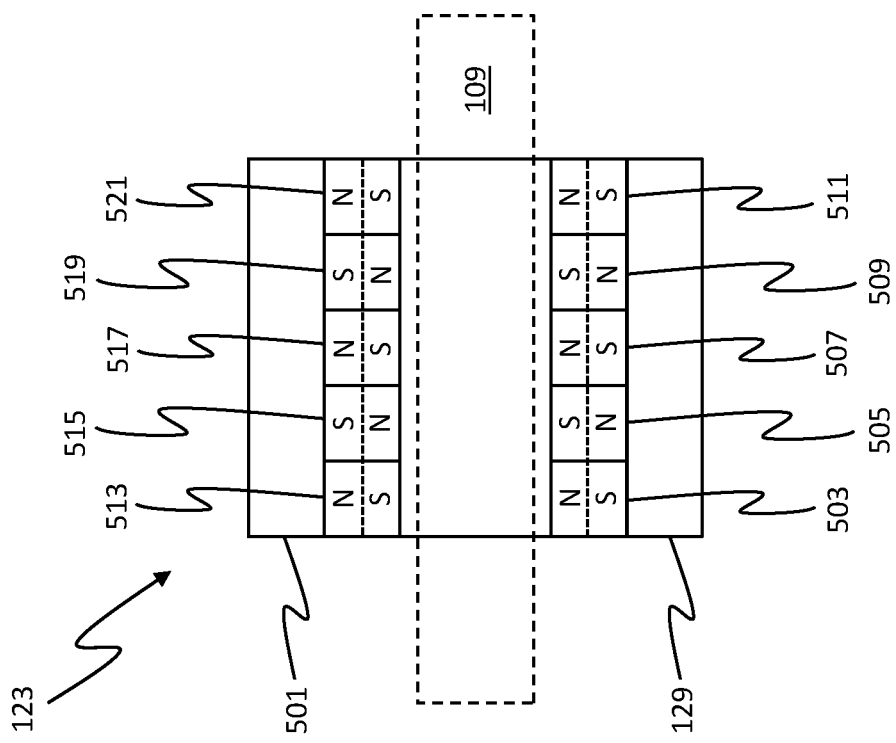
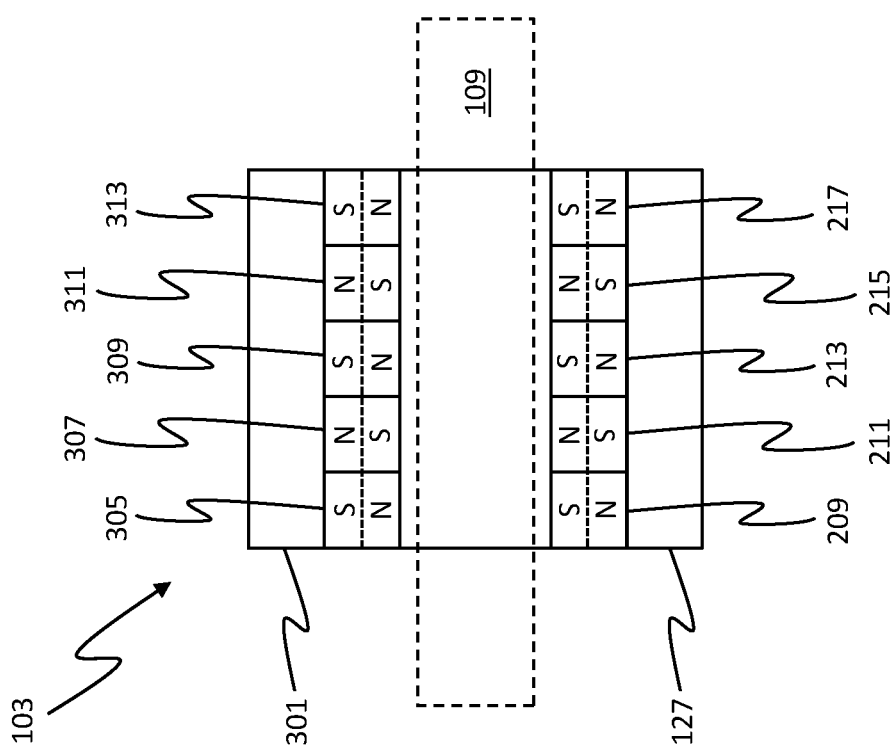

METHOD FOR IDENTIFYING A CARRIAGE OF A LINEAR TRANSPORT SYSTEM

CROSS-REFERENCE TO RELATED APPLICATIONS

This is a continuation of International Patent Application PCT/EP2019/069518, filed 19 Jul. 2019, METHOD FOR IDENTIFYING A CARRIAGE OF A LINEAR TRANSPORT SYSTEM, and claims priority to German Patent Application DE 10 2018 118 814.5, filed 2 Aug. 2018, entitled VERFAHREN ZUM IDENTIFIZIEREN EINES SCHLITTENS EINES LINEAREN TRANSPORTSYSTEMS, each of which is incorporated by reference herein, in the entirety and for all purposes.

FIELD

The invention relates to two methods for identifying a carriage of a linear transport system. The invention furthermore relates to a device that is designed to carry out all of the steps of the method or of the methods for identifying a carriage of a linear transport system. The invention also relates to a linear transport system, to a computer program and to a machine-readable storage medium.

BACKGROUND

EP 3 044 133 B1 discloses a method for adapting travel profiles of a multiplicity of individually controllable transport elements for transporting containers in a container handling system along a transport path, wherein the multiplicity of transport elements are arranged movably on the transport path. The transport elements are placed such that there is a repulsive interaction between two transport elements that are adjacent along the transport path on account of a corresponding magnet arrangement, such that collisions are able to be avoided or at least attenuated.

EP 3 044 133 B1 furthermore discloses that a position of a transport element may be determined by way of a multiplicity of sensors, for example magnetic field sensors, arranged along the transport path.

By way of example, by arranging sensors regularly and periodically along at least a section of the transport path, it is possible to determine a position of a transport element on this section of the transport path. The sensor may in this case be designed as an optical sensor, electrical sensor, electromagnetic sensor or mechanical sensor, it being possible to determine the position of the transport element in the region of the sensor for example by measuring a light reflection from a reflector element of the transport element, by inducing an electromagnetic signal on account of the movement of the transport element, by changing the electrical resistance of the sensor utilizing a magnetoresistive effect, for example on account of the magnetic flux of a magnetic reference element, for example a permanent magnet, or the reaction element of the transport element, or through a local pressure measurement based on the weight of the transport element.

An electromagnetic sensor may in this case be designed as a Hall sensor, which also delivers a signal when the magnetic field in which it is located is constant.

In order to be distinguished individually, a transport element may comprise a unique identification unit, for example in the form of a barcode, readable memory chip, a printed, adhesively bonded and/or engraved alphanumeric code, wherein one or more identification detection devices along the transport path make it possible to identify the transport element that passes by the corresponding identification detection device.

With regard to this identification option, one disadvantage is that the carriages first of all have to travel to the identification detection device in order to be identified. Depending on their current position, the carriages may possibly have to be moved significantly. This may take a considerable amount of time.

SUMMARY

The invention provides a concept for the efficient identification of a carriage of a linear transport system.

According to first aspect, a method for identifying a carriage of a linear transport system is provided, wherein the linear transport system has a first carriage, a second carriage, a controller and a linear motor for driving the first and the second carriage, wherein the linear motor comprises a stator having at least two drive coils and comprises a first and a second rotor, wherein the first rotor is arranged on the first carriage and the second rotor is arranged on the second carriage, wherein the first carriage has a first magnetic field generator that is designed to generate a first magnetic field, and the second carriage has a second magnetic field generator that is designed to generate a second magnetic field, and wherein the first magnetic field generator differs from the second magnetic field generator at least in terms of its magnetic vector field.

The method comprises following steps: Applying a first control signal to the stator having at least two drive coils, this control signal triggering a first measurement that depends on the magnetic vector field of the magnetic field generators of the two carriages; receiving at least one first measurement signal associated with one of the two carriages, which measurement signal is based on the first measurement; identifying the carriage associated with the first measurement signal as the first carriage or as the second carriage based on the at least the first measurement signal, wherein at least one reference value is stored in the controller and is associated with one of the two carriages, wherein the identification of the carriage is based on a comparison between the first measurement signal and the at least one reference value; and outputting a first or a second identification signal that represents an identification of the carriage associated with the first measurement signal as the first or the second carriage.

According to second aspect, a linear transport system comprises a first carriage and a second carriage, a linear motor for driving the first carriage and the second carriage, a plurality of Hall sensors, and a guide rail. The linear motor comprises a stator and a first and a second rotor. The stator has a plurality of drive coils that are arranged along the guide rail individual motor modules comprise a plurality of drive coils. The first rotor is arranged on the first carriage and the second rotor is arranged on the second carriage. The first carriage has a first magnetic field generator. The second carriage has a second magnetic field generator. The first magnetic field generator differs from the second magnetic field generator at least in terms of its magnetic vector field. The magnetic fields of the magnetic field generators are detected to identify the corresponding carriage.

According to third aspect, a linear transport system comprises a first carriage, a second carriage, a guide rail, and a linear motor for driving the first and the second carriage along the guide rail. The linear motor comprises a stator and a first and a second rotor. The stator has motor modules that are arranged along the guide rail and each comprise drive coils. The first rotor is arranged on the first carriage and the second rotor is arranged on the second carriage. The first carriage has a first magnetic field generator that has a plurality of magnets oriented along the guide rail and is designed to generate a first magnetic field. The second carriage has a second magnetic field generator that has a plurality of magnets oriented along the guide rail and is designed to generate a second magnetic field. The magnets of the first magnetic field generator and the magnets of the second magnetic field generator are oriented in each case alternately with the south pole and the north pole facing the motor modules.

The first magnetic field generator differs from the second magnetic field generator at least in terms of its magnetic vector field, in which the pole orientation of the magnets of the first magnetic field generator of the first carriage is exactly opposite the pole orientation of the magnets of the second magnetic field generator of the second carriage with regard to the orientation toward the motor modules, such that, when the magnetic field generators are considered in the case of first and second carriages placed on the guide rail, the south pole of the first magnet of one magnetic field generator and the north pole of the first magnet of the other magnetic field generator are oriented facing the motor modules. A first control signal is applied to the stator, this first control signal triggering a first measurement that depends on the magnetic vector field of the magnetic field generators of the two carriages.

At least one first measurement signal associated with one of the two carriages is received, which first measurement signal is based on the first measurement. The carriage associated with the first measurement signal is identified as the first carriage or as the second carriage based on the at least the first measurement signal. At least one reference value is associated with one of the two carriages, wherein the identification of the carriage is based on a comparison between the first measurement signal and the at least one reference value. A first or a second identification signal is outputted that represents an identification of the carriage associated with the first measurement signal as the first or the second carriage.

EXAMPLES

A linear transport system has a first carriage, a second carriage, a controller and a linear motor for driving the first and the second carriage, wherein the linear motor comprises a stator having at least two drive coils and comprises a first and a second rotor, wherein the first rotor is arranged on the first carriage and the second rotor is arranged on the second carriage, wherein the first carriage has a first magnetic field generator that is designed to generate a first magnetic field, and the second carriage has a second magnetic field generator that is designed to generate a second magnetic field, and wherein the first magnetic field generator differs from the second magnetic field generator at least in terms of its magnetic vector field. A method for identifying a carriage of the linear transport system comprises the following steps:

applying a first control signal to the stator having at least two drive coils, which control signal triggers a first measurement that depends on the magnetic vector field of the magnetic field generators of the two carriages, receiving at least one first measurement signal associated with one of the two carriages, which measurement signal is based on the first measurement, identifying the carriage associated with the first measurement signal as the first carriage or as the second carriage based on the at least the first measurement signal, wherein at least one reference value is stored in the controller and is associated with one of the two carriages, wherein the identification of the carriage is based on a comparison between the first measurement signal and the at least one reference value, and outputting a first or a second identification signal that represents identification of the carriage associated with the first measurement signal as the first or the second carriage.

The concept described here is based on the idea that the different magnetic field generators form a magnetic identification system or means for the carriages of the linear transport system, by way of which a carriage is able to be efficiently identified. Identification in the sense of the description in particular means distinguishing between at least two carriages. Identification in the sense of the description is thus not a type of position recognition, but advantageously allows one carriage to be able to be distinguished from the other.

This thus means that a first magnetic identification means of the first carriage is formed by way of the first magnetic field or the first magnetic field generator. This thus means that a second magnetic identification means of the second carriage is formed by way of the second magnetic field or the second magnetic field generator.

The individual carriages may then be identified efficiently using these two identification means.

Due to the fact that the first magnetic field generator differs from the second magnetic field generator at least in terms of its magnetic vector field, the first magnetic identification means thus also differs from the second magnetic identification means. Unambiguous identification of the respective carriages via the identification means is thus advantageously made possible.

A measurement that depends on a magnetic field will therefore in each case provide a different result depending on whether the measurement depends on the first or second magnetic field. A measurement signal based on this measurement may then advantageously be used to identify the carriage associated with this measurement signal either as the first or as the second carriage.

Due to the fact that, according to one aspect, the respective rotor of the carriages is used for this identification, it is not necessary to attach additional identification units, for example in the form of a readable memory chip, to the carriage itself.

This thereby makes it possible to save on costs. An assembly step necessary for this arrangement of such a memory chip on the carriage is also dispensed with.

Another advantage is that the carriages no longer have to be moved significantly. In the case of identification using a Hall sensor, all of the carriages have to be moved over the entire distance until the carriage to be identified passes a Hall sensor.

Due to the fact that, according to one aspect, a magnetic field generator provided in addition to a rotor is used for this identification, the rotor may be designed for optimal magnetic interaction with the drive coils.

If there is an additional magnetic field generator, for example for position detection, then a position detection system is generally provided in the linear transport system in order to detect the position. If one of these magnetic field generators is then changed for position detection purposes, then this magnetic field generator may also be distinguished from the others in addition to the position using the existing position detection system, such that unambiguous identification is thereby also made possible. Due to the fact that the position detection system (for example comprising Hall sensors) is able to detect the position over the entire travel path of the carriages, the identification of all of the carriages works regardless of where they are currently located.

A further magnetic field generator, which is different from the rotor, furthermore has the advantage that it is able to be changed freely from the rotor, that is to say for example freely from drive magnets of the rotor, and optimized for position detection and identification. In addition, the signals are also not changed by the magnetic fields of the rotor, for example by magnetic fields of the drive magnets, as a result of which lower-interference recognition may also lead to better results with regard to identification.

This thus in particular brings about the technical advantage of providing a concept for efficiently identifying a carriage of a linear transport system.

According to one embodiment, a plurality of first carriages are provided. First carriages in the sense of the description each comprise a first rotor.

According to one embodiment, a plurality of second carriages are provided. Second carriages in the sense of the description each comprise a second rotor.

Explanations given in connection with the first carriage apply analogously to the second carriage, and vice versa.

According to one embodiment, there is provision for the respective magnetic vector field to depend on a size of the respective magnetic field generator and/or a respective polarity of the respective magnetic field generator and/or a respective orientation of the respective magnetic field generator and/or a respective material of the respective magnetic field generator and/or on a number and/or a spacing between the poles of the respective magnetic field generator. This means for example that the number and/or the spacing of the poles of the first magnetic field generator differ from those of the second magnetic field generator.

This thereby brings about the technical advantage, for example, that the magnetic fields that are generated differ efficiently from one another.

According to one embodiment, a magnetic field generator in the sense of the description comprises one or more magnets, for example permanent magnets.

A magnetic vector field in the sense of the description has for example one or more of the following features or properties: a certain distribution of the magnetic field strength and a certain distribution of the magnetic field direction.

A magnetic vector field in the sense of the description may be influenced or characterized for example by way of one or more of the following influencing factors: Size of the magnets, shape of the magnets, position of the magnets, material of the magnets, magnetization of the magnets, number of magnets.

Different magnetic field generators thus differ for example in terms of at least one of the above features or properties or influencing factors.

This thus means in particular that the magnetic field generators differ from one another at least in terms of their sizes and/or in terms of their polarity and/or in terms of their orientation and/or their respective material and/or in terms of their pole number and/or in terms of their pole spacing.

There is provision for at least one reference value to be stored in the controller, which reference value is associated with one of the two carriages, wherein the identification of the carriage associated with the first measurement signal as the first or as the second carriage is based on a comparison between the first measurement signal and the at least one reference value.

This thereby brings about the technical advantage, for example, that the carriage is able to be identified efficiently.

According to one embodiment, there is provision for the at least one reference value to be stored in a controller, from which the reference value is read, wherein the at least one reference value is based for example on a previous measurement or for example based on an expectation.

The fact that the at least one reference value is based on a previous measurement is to be described below by way of example for identification using a saturated inductor. The principle of identification based on a saturated inductor is described in more detail below in the explanations relating to the embodiment with regard to the saturation position (see also FIG. 8 and the associated description of the figures).

One or more specific positions with regard to which drive coil is saturated to a sufficient extent by one of the drive magnets of the carriage located at the specific position were measured beforehand, and for example the direction (direction of travel) in which the carriage has to be moved in order further saturate the drive coil or to bring it out of saturation was also measured beforehand.

If, at a later point in time, a carriage that has not yet been identified is then located at the specific position, it may then be ascertained whether or not the current saturation of the drive coil corresponds to the previous measured saturation (at least within acceptable tolerances) or whether or not the direction of travel of the carriage with regard to putting into or bringing out of saturation corresponds to the previous measured direction of travel.

The first and/or the second magnetic field generator may furthermore for example be measured beforehand (for example using one or more Hall sensors), wherein the measurement signals corresponding to this measurement are stored as reference values in the controller, such that the current measurement signal is able to be compared with two previously measured reference values that are stored in the controller.

In the case of identification based on an embodiment comprising outputting a current vector control signal (see also FIG. 7 and the associated description of the figures) and comprising detecting a movement of a carriage resulting from the outputting of the current vector control signal, measurements may for example be performed beforehand for the first and/or second magnetic field generator as to the direction in which the corresponding carriage moves with which current vector control signal, such that this result may be used as reference value for a later measurement.

According to one embodiment, there is provision for at least one second measurement signal associated with the other of the two carriages to be received, this measurement signal being based on a second measurement that depends on the magnetic field of the magnetic field generator of the other of the two carriages, wherein the identification of the carriage associated with the first measurement signal as the first or as the second carriage is based on a comparison between the first measurement signal and the at least one received second measurement signal.

This thereby brings about the technical advantage, for example, that the carriage is able to be identified efficiently.

According to a further embodiment, there is provision for a second control signal to be applied to the stator having at least two drive coils, this triggering a second measurement that depends on the magnetic vector field of the magnetic field generators of the two carriages, wherein a second measurement signal that is based on the second measurement is received.

According to one embodiment, the method comprises the following steps: receiving a first position signal that represents a first position of one of the two carriages, after receiving the first position signal, outputting at least one first current vector control signal for distributing at least one first current vector based on a first commutation rule via the drive coils, in order to drive the carriage located at the first position, wherein the at least one first measurement signal comprises a second position signal, wherein the second position signal represents at least one position of the carriage driven based on the output first current vector control signal after the first current vector control signal has been output, wherein a kinematic behavior of the carriage associated with the first measurement signal is ascertained based on the first position signal and on the second position signal after the first current vector control signal has been output, wherein the carriage associated with the first measurement signal is identified as the first or as the second carriage based on the ascertained kinematic travel behavior.

This thereby brings about the technical advantage, for example, that the carriage is able to be identified efficiently.

This embodiment is thus based on the fact that different rotors cause different travel behavior for the carriages. Depending on the generated magnetic field, the carriage is driven faster or slower, for example. By way of example, the carriage moves in a specific direction depending on the generated magnetic field of the corresponding magnetic field generator. The carriage may then for example be identified thereby, that is to say via the direction and/or via the speed.

An expectation thus indicates for example the direction in which the first carriage is driven with the first current vector control signal and/or indicates a specific direction in which the second carriage is driven with the first current vector control signal.

By way of example, the two directions of travel with respect to the first and the second carriage are opposite to one another with an identical first current vector control signal.

The corresponding carriage may thus be efficiently identified as the first or as the second carriage via a direction of travel of the carriage.

By way of example, there is provision, based on the first position signal and on the second position signal, to ascertain a first drive direction in which the carriage driven based on the output first current vector control signal has moved after the at least one first current vector control signal has been indicated, wherein the carriage associated with the first measurement signal is identified as the first or as the second carriage based on the ascertained first drive direction.

This in particular thereby brings about the technical advantage that this type of identification is highly robust. This is because the polarity or the mathematical sign are significantly more different than if only one variable or amplitude were to be evaluated. This type of identification may also be implemented easily and quickly in a pre-existing linear transport system.

According to one embodiment, there is provision, when one of the two carriages is located in a saturation position in relation to one of the drive coils, in which the magnetic field of the corresponding magnetic field generator puts a coil core of the one drive coil into saturation, for a first setpoint current control signal for energizing the one drive coil with a first setpoint AC current to be output, wherein the at least one first measurement signal comprises a first voltage measurement signal that represents a derived coil voltage of the drive coil energized with the first setpoint AC current after the first setpoint current control signal has been output.

The derived coil voltage corresponds to the setpoint voltage that results at the output of a current controller for energizing the drive coils and that corresponds to the setpoint voltage calculated in the current controller.

This thereby brings about the technical advantage, for example, that the carriage is able to be identified efficiently.

This in particular brings about the technical advantage that a corresponding magnetic field measurement is able to be performed quickly and simultaneously even in the case of multiple carriages. By way of example, this brings about the technical advantage that the carriage or carriages do not have to move for the identification.

According to a further embodiment, there is provision for a second setpoint current control signal for energizing the one drive coil with a first setpoint DC current to be output, wherein a second voltage measurement signal is received, this representing a derived coil voltage of the drive coil energized with the first setpoint DC current after the second setpoint current control signal has been output, wherein a resistive voltage component of the derived coil voltage of the first voltage measurement signal is calculated based on the second voltage measurement signal, wherein the resistive voltage component is subtracted from the derived coil voltage of the first voltage measurement signal in order to ascertain a coil voltage corrected for the resistive voltage component, wherein the carriage associated with the first measurement signal is identified as the first carriage or as the second carriage based on the ascertained corrected coil voltage.

Due to the resistive component having been factored out, a signal difference between the measurements of the two different magnetic field generators advantageously increases in comparison with the overall signal amplitude.

According to another embodiment, there is provision for at least one of the magnetic field generators to comprise at least one permanent magnet and/or at least one coil, wherein the at least one permanent magnet and/or the at least one coil is used in each case as a drive magnet or rotor of the linear motor.

This thereby brings about the technical advantage, for example, that the drive magnets of the linear motor, which are arranged on the carriages, are able to be used efficiently to identify the carriages.

Technical functionalities with regard to the device and/or the linear transport system or systems become apparent analogously from corresponding technical functionalities with regard to the method or methods, and vice versa.

This thus means in particular that device and/or system features become apparent from corresponding method features, and vice versa.

According to one embodiment, the linear transport system comprises a guide rail for guiding the carriages. By way of example, the carriages comprise rollers and, by way of example, the guide rail comprises running surfaces on which the rollers are able to roll.

In one embodiment, the linear transport system comprises a position detection system that is designed to ascertain a current position of the carriages and to provide position signals in accordance with the ascertained current position.

A drive coil in the sense of the description comprises for example a coil core, which may also be referred to as a stator core, wherein the drive coil is wound around the coil core.

BRIEF DESCRIPTION OF THE DRAWINGS

The invention will be discussed in more detail below on the basis of figures. Here, in a schematic illustration in each case:

FIG. 4 shows a further highly simplified plan view of a first carriage of the linear transport system shown in FIG. 1.

FIG. 5 shows a highly simplified plan view of a second carriage of the linear transport system shown in FIG. 1.

DETAILED DESCRIPTION

Figure 1:
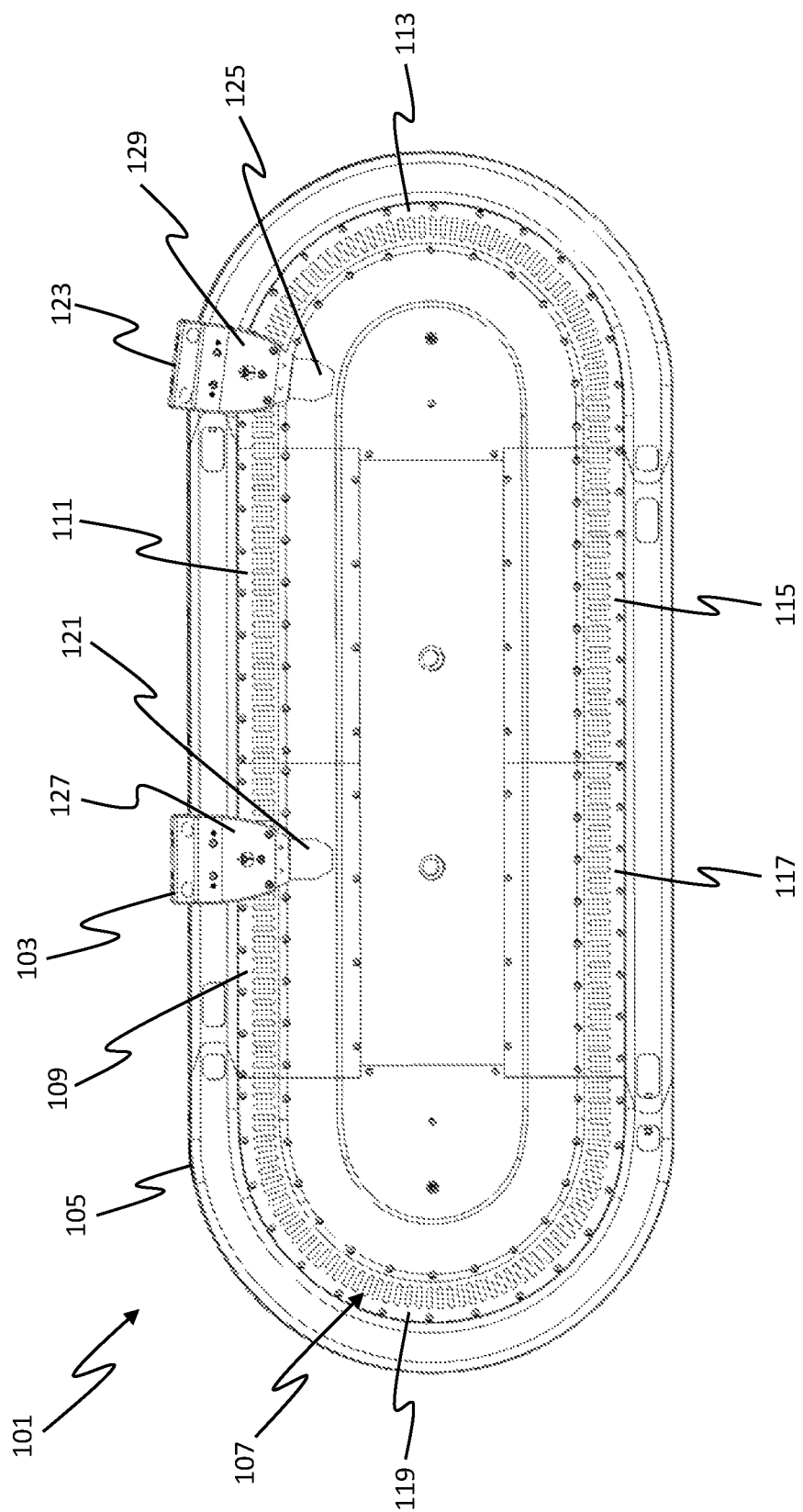
FIG. 1 shows a side view of a linear transport system.

In the following, the same reference numerals may be used for same features. For reasons of clarity, it may also be the case that not all elements are shown in every figure. Furthermore, for the sake of clarity, it may occur that not every element in every drawing has its own reference numeral.

FIG. 1 shows a side view of a linear transport system 101.

The linear transport system comprises a first carriage 103 that is guided along a guide rail 105.

The guide rail 105 may be part of the linear transport system 101.

The linear transport system 101 comprises a linear motor 107 for driving the first carriage 103.

The linear motor 107 comprises a first motor module 109, a second motor module 111, a third motor module 113, a fourth motor module 115, a fifth motor module 117 and a sixth motor module 119. The individual motor modules are mechanically (and for example electrically) connected to one another and are arranged along the guide rail 105.

The individual motor modules comprise a plurality of drive coils, in detail in FIG. 1, these forming a stator of the linear motor 107.

A first transmitter tab 121 is arranged on the first carriage 103. The first transmitter tab 121 interacts with a position detection system of the linear transport system 101 in order to ascertain a position of the first carriage 103.

The linear transport system 101 comprises a second carriage 123 that is guided by way of the guide rail 105. The linear motor 107 drives the second carriage 123.

A second transmitter tab 125, which interacts with the position detection system in the same way as the first transmitter tab 121 of the first carriage 103 in order to ascertain a position of the second carriage 123, is arranged on the second carriage 123.

The first carriage 103 comprises a first carrier 127 and a second carrier, not visible due to the side view, which is opposite the first carrier 127. The motor module 109 is located between the first carrier 127 and the second carrier. Drive magnets, which form a first magnetic field generator for generating a first magnetic field, are arranged on the first carrier 127.

These drive magnets are arranged on an inside of the first carrier 127 and face the front side, shown in FIG. 1, of the motor modules 109 to 119.

In the same way as the first carrier 127, a plurality of drive magnets, likewise not visible here, are arranged on an inside of the second carrier. These drive magnets, in the same way as the drive magnets of the first carrier 127 that face the front side of the motor modules 109 to 119, are opposite the rear side of the motor modules 109 to 119. The drive coils of the motor modules 109 to 119 generate corresponding magnetic fields depending on a corresponding energization, which magnetic fields interact with the magnetic fields of the drive magnets in order to drive the first carriage 103 and thus form a first rotor of the linear motor 107.

In the same way as the first carriage 103, the second carriage 123 also has a third carrier 129, on the inside of which a plurality of drive magnets are arranged.

In the same way as the first carriage 103, the second carriage 123 also has a fourth carrier, which is not visible in FIG. 1. A plurality of drive magnets are likewise arranged on an inside of the fourth carrier. The drive magnets of the second carriage 123 form a second magnetic field generator for generating a second magnetic field, and thus form a second rotor of the linear motor 107.

The first magnetic field generator of the first carriage 103 differs from the second magnetic field generator of the second carriage 123 at least in terms of its magnetic vector field.

Figure 2:
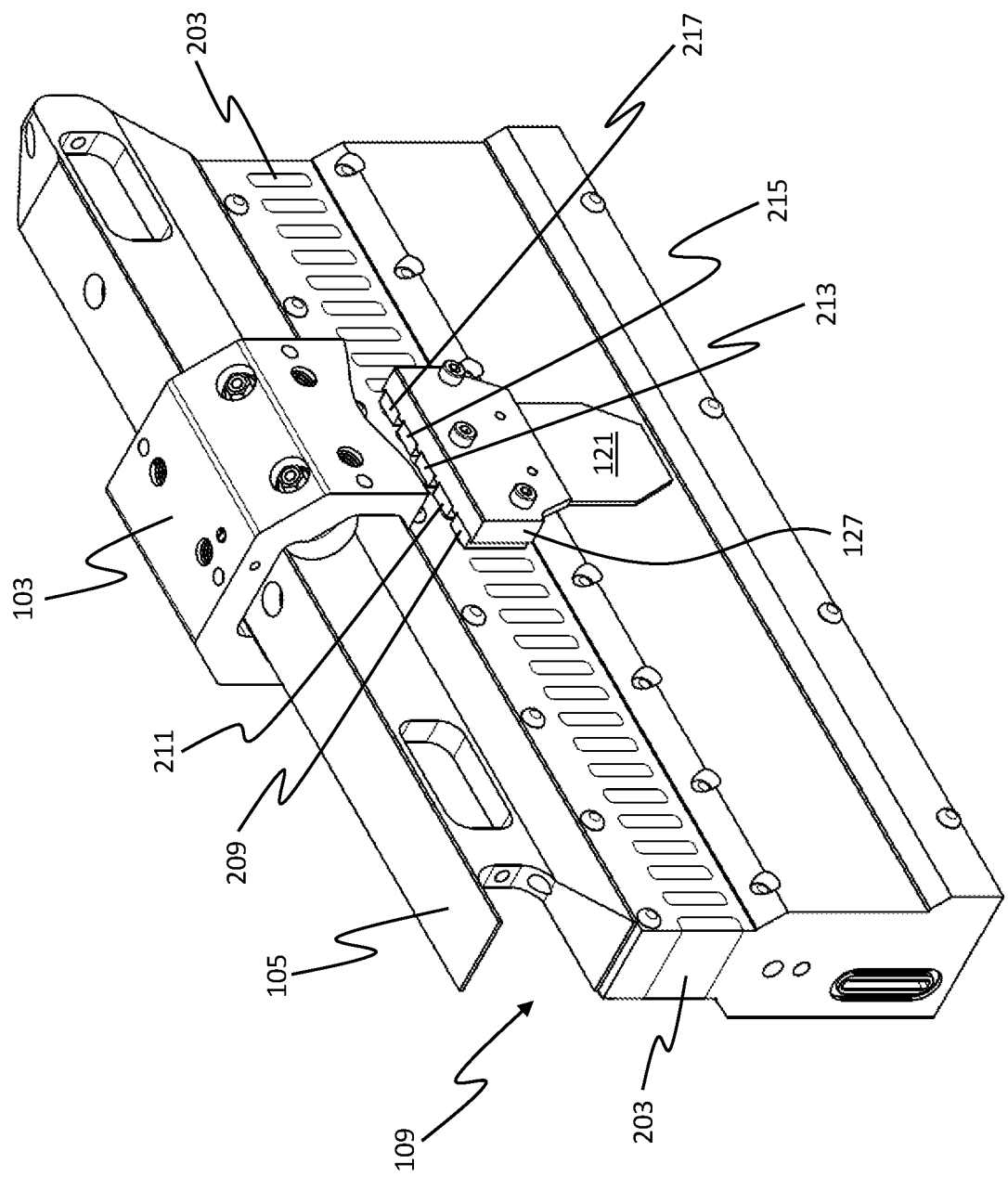
FIG. 2 shows a perspective view of a motor module of the linear transport system shown in FIG. 1.

FIG. 2 shows a perspective view of the first motor module 109 with an excerpt of the first carriage 103.

For the sake of clarity, only the first transmitter tab 121 and the first carrier 127 are shown for the first carriage 103, the second carrier not being visible due to the perspective selected in FIG. 2.

The first motor module 109 comprises a plurality of coil cores 203 that are arranged next to one another and that may generally also be referred to as stator cores.

Every second coil core 203 is wound around by a coil. This thus means that every second coil core 203 is not wound around, that is to say is free from a coil.

In one embodiment, there is provision for each coil core 203 to be wound around in each case by a coil.

The second motor module 111, the fourth motor module 115 and the fifth motor module 117 of the linear transport system 101 have a structure analogous to the first motor module 109 according to FIG. 2.

The third motor module 113 and the sixth motor module 119 have a structure essentially analogous to the first motor module 109, there being a difference in terms of a geometry that is predefined by the guide rail 105.

A first magnet 209, a second magnet 211, a third magnet 213, a fourth magnet 215 and a fifth magnet 217 are arranged on the inside, facing the coil cores 203 or the first motor module 109, of the first carrier 127.

In the same way as for the first carrier 127, five magnets are likewise arranged on the second carrier, which is covered by the first motor module 109 and thus not visible, such that they each face the coil cores 203 or the first motor module 109, and in particular are opposite the first to fifth magnets 209 to 217 of the first carrier 127.

These ten magnets thus each form a total of five magnet pairs. The respective magnetic poles of the magnets opposite one another are arranged opposing one another, that is to say point in opposing directions or have opposing magnetic polarities.

These ten magnets are drive magnets and form the rotor of the linear motor. They are also part of the first magnetic field generator.

The drive magnets are for example permanent magnets.

Figure 3:
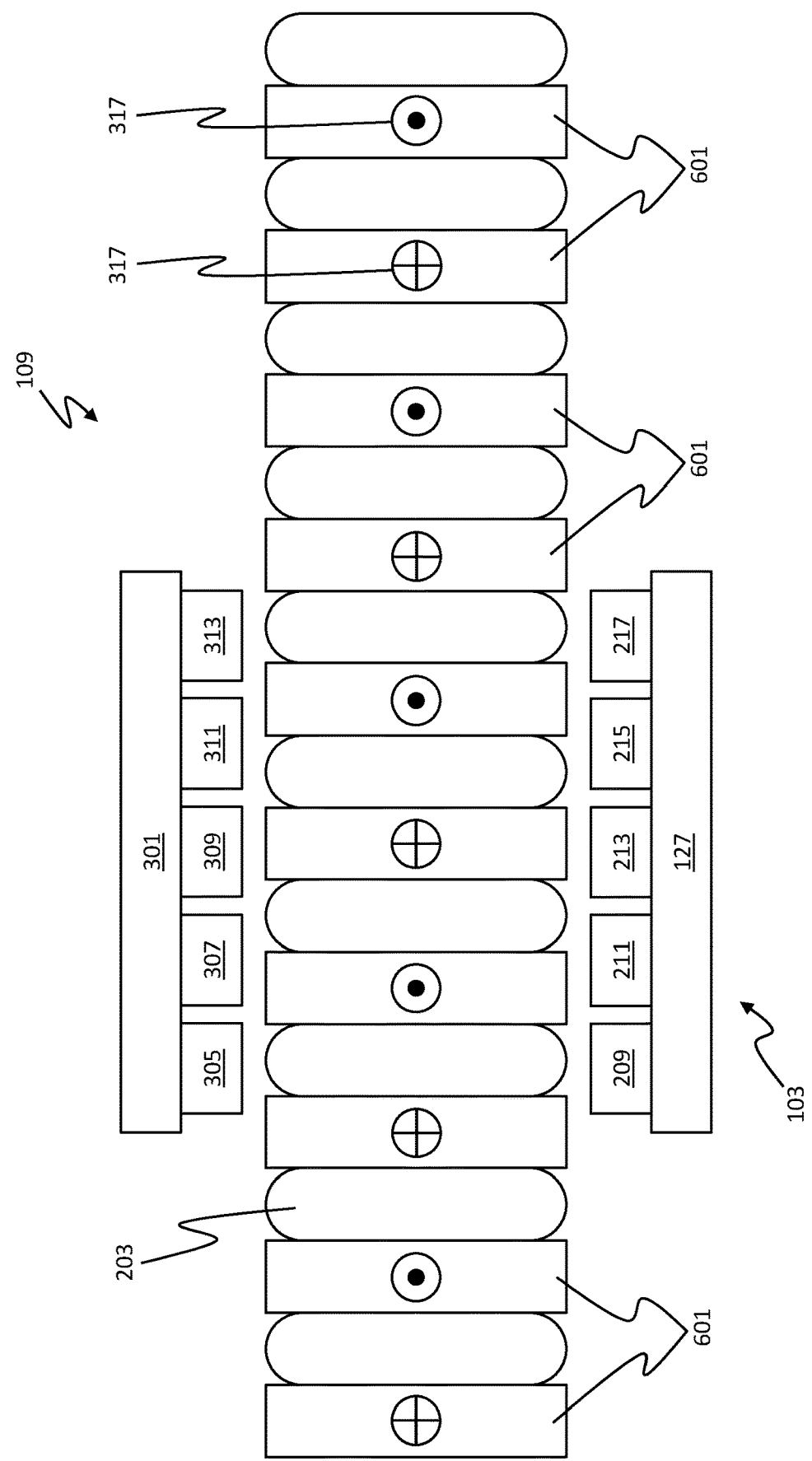
FIG. 3 shows a highly simplified plan view of the linear transport system shown in FIG. 1.

FIG. 3 shows a highly simplified sectional plan view of the first carriage 103 and the first motor module 109 with the coil cores 203 and the coils 601.

The plan view shows the first carrier 127 and the opposite second carrier 301 of the first carriage 103. The second carrier 301 has an inside facing the coil cores 203 or the first motor module 109 and on which a sixth magnet 305, a seventh magnet 307, an eighth magnet 309, a ninth magnet 311 and a tenth magnet 313 are arranged.

These sixth to tenth magnets 305 to 313 of the second carrier 301, as already described above, form, with the first to fifth magnets 209 to 217 of the first carrier 127, five magnet pairs.

Reference numeral 317 indicates the current direction of a current flowing through the coils.

FIG. 4 shows an even more greatly simplified schematic plan view of the first carriage 103. And FIG. 5 shows an even more greatly simplified schematic plan view of the second carriage 123. For easier understanding, the features of FIGS. 4 and 5 are described together below.

The first motor module is illustrated only schematically in FIG. 4 and FIG. 5.

The letter "N" in this case stands for the north pole of the corresponding drive magnet of the first carriage 103 and of the second carriage 123. The letter "S" furthermore stands for the south pole of the corresponding drive magnet of the first carriage 103 and of the second carriage. The drive magnets of the first and second carriage 103, 123 are each oriented facing the first motor module 109 with either their south pole S or their north pole N.

The first magnet 209 therefore thus points in the direction of the first motor module 109 with its south pole S and in the direction of the first carrier 127 with its north pole N. The second magnet 211 points in the direction of the first motor module 109 with its north pole N and in the direction of the first carrier 127 with its south pole S. The third magnet 213 points in the direction of the first motor module 109 with its south pole S and in the direction of the first carrier 127 with its north pole N. The fourth magnet 215 points in the direction of the first motor module 109 with its north pole N and in the direction of the first carrier 127 with its south pole S. The fifth magnet 217 points in the direction of the first motor module 109 with its south pole S and in the direction of the first carrier 127 with its north pole N.

The sixth magnet 305, which forms a magnetic field pair with the first magnet 209, points in the direction of the first motor module 109 with its north pole N and in the direction of the second carrier 301 with its south pole S. The seventh magnet 307, which forms a second magnet pair with the second magnet 211, points in the direction of the first motor module 109 with its south pole S and in the direction of the second carrier 301 with its north pole N. The eighth magnet 309, which forms a third magnet pair with the third magnet 213, points in the direction of the first motor module 109 with its north pole N and in the direction of the second carrier 301 with its south pole S. The ninth magnet 311, which forms a fourth magnet pair with the fourth magnet 215, points in the direction of the first motor module 109 with its south pole S and in the direction of the second carrier 301 with its north pole N. The tenth magnet 313, which forms a fifth magnet pair with the fifth magnet 217, points in the direction of the first motor module 109 with its north pole N and in the direction of the second carrier 301 with its south pole S.

The second carriage 123 comprises the third carrier 129 and the fourth carrier 501.

An eleventh magnet 503, a twelfth magnet 505, a thirteenth magnet 507, a fourteenth magnet 509 and a fifteenth magnet 511 are arranged on an inside, facing the motor module 109, of the third carrier 129.

A sixteenth magnet 513, a seventeenth magnet 515, an eighteenth magnet 517, a nineteenth magnet 519 and a twentieth magnet 521 are arranged on the inside, facing the motor module 109, of the fourth carrier 501.

In the same way as for the first carriage 103, the eleventh magnet 503 and the sixteenth magnet 513 form a first magnet pair, and the twelfth magnet 505 and the seventeenth magnet 515 form a second magnet pair, and the thirteenth magnet 507 and the eighteenth magnet 517 form a third magnet pair, and the fourteenth magnet 509 and the nineteenth magnet 519 form a fourth magnet pair, and the fifteenth magnet 511 and the twentieth magnet 521 form a fifth magnet pair.

These ten magnets of the second carriage 123 form drive magnets or the rotor of the linear motor.

The eleventh magnet 503 thus points in the direction of the first motor module 109 with its north pole N and in the direction of the third carrier 129 with its south pole S. The twelfth magnet 505 points in the direction of the first motor module 109 with its south pole S and in the direction of the third carrier 129 with its north pole N. The thirteenth magnet 507 points in the direction of the first motor module 109 with its north pole N and in the direction of the third carrier 129 with its south pole S. The fourteenth magnet 509 points in the direction of the first motor module 109 with its south pole S and in the direction of the third carrier 129 with its north pole N. The fifteenth magnet 511 points in the direction of the first motor module 109 with its north pole N and in the direction of the third carrier 129 with its south pole S. The sixteenth magnet 513 points in the direction of the first motor module 109 with its south pole S and in the direction of the fourth carrier 501 with its north pole N. The seventeenth magnet 515 points in the direction of the first motor module 109 with its north pole N and in the direction of the fourth carrier 501 with its south pole S. The eighteenth magnet 517 points in the direction of the first motor module 109 with its south pole S and in the direction of the fourth carrier 501 with its north pole N. The nineteenth magnet 519 points in the direction of the first motor module 109 with its north pole N and in the direction of the fourth carrier 501 with its south pole S. The twentieth magnet 521 points in the direction of the first motor module 109 with its south pole S and in the direction of the fourth carrier 501 with its north pole N.

The magnets of the two carriages 103 and 123 are each designed identically, but differ in terms of their north-south pole orientation and thus in terms of their magnetic vector field.

The corresponding pole orientations of the individual magnets in the case of the second carriage 123 are exactly opposite in comparison with the corresponding pole orientations of the magnets of the first carriage 103 with regard to the orientation toward the first motor module 109.

In other words, the individual magnets of the second carriage 123 are rotated by 180° in comparison with the corresponding magnets of the first carriage 103 with regard to their orientation in the direction of the first motor module 109. Or, in other words, the second carriage 123 with its second magnetic field generator is identical to the first carriage 103 with its first magnetic field generator, but has been rotated by 180° with respect to the longitudinal orientation of the first motor module 109 and placed onto the guide rail 105 such that the corresponding magnetic vector field of the first carriage 103 differs from the magnetic vector field of the second carriage 123 during operation of the linear transport system 101.

Due to these different arrangements of the drive magnets of the two carriages 103, 123, the two carriages behave differently when the drive coils are energized identically. With an identical current vector, which is distributed to the drive coils using a commutation rule, one of the two carriages moves in the direction of the current vector, whereas the other of the two carriages moves away from this current vector.

A current vector may thereby thus for example be switched once with a positive current value and once with a negative current value. The different arrangement or orientation of the individual poles of the magnets of the two carriages brings about a different response in both cases. It is thereby then possible to make a statement as to whether the driven carriage is the first carriage 103 or the second carriage 123.

The advantage if a current vector is distributed to the drive coils once with a positive current value and once with a negative current value using a commutation rule is in particular that it is then also made possible to identify the carriages when the carriage is for example under the influence of a force acting in one direction. This may for example be the force of gravity in the curve in the case of a stationary carriage. The constant force may then advantageously not erroneously influence the measurement in both directions.

According to one embodiment, the current vector may be applied such that, with respect to a current position of the carriages, it first of all generates no force on the corresponding carriage (regardless of the corresponding pole orientation of the drive magnets). The current vector is therefore in a neutral position in terms of its force effect. Then, according to one embodiment, there is provision for the current vector to be moved out of the neutral position until a movement of the corresponding carriage is detected or recognized. The movement of the corresponding carriage may for example be detected using the position detection system, which provides position signals corresponding to a current position of the carriage. Based on these position signals, it is possible to ascertain for example whether or not the carriage is moving, or the direction in which the carriage is moving or has moved.

In exactly the same way, according to one embodiment, there may also be provision for a value of the current vector to be increased until a minimum movement is detected or recognized, which may for example be detected in analog form by way of the position detection system. It is thereby advantageously possible for example to achieve a situation whereby a carriage with little mass and little friction in an identification has just as little movement as a carriage with a large amount of load and friction.

A movement of around 100 μm is usually sufficient to recognize a direction of travel of the corresponding carriage and thereby to identify the carriage.

In one embodiment, there is provision for the corresponding carriage to be moved back to its original position, from which the identification method started, after it has been identified.

Figure 6:
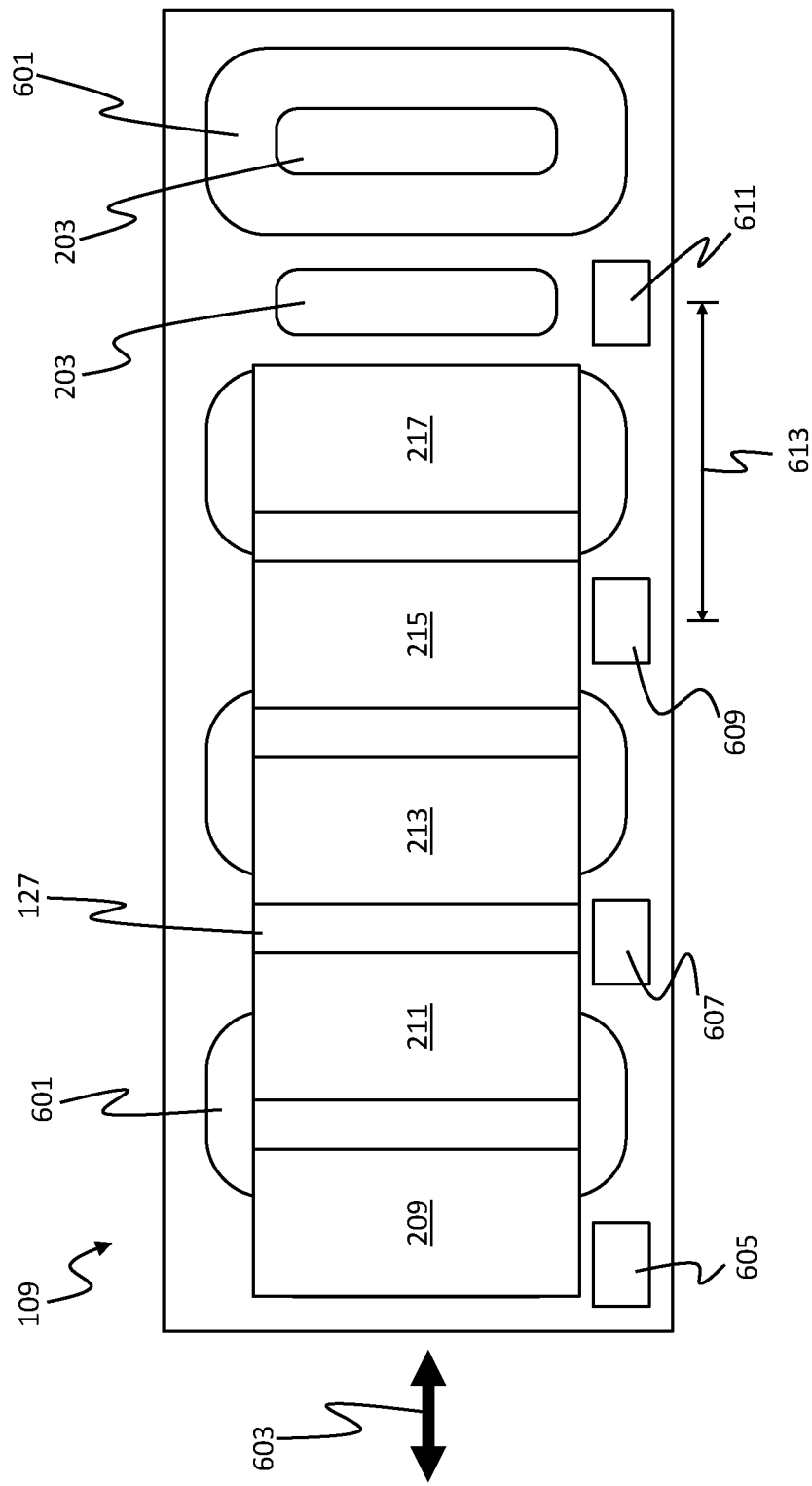
FIG. 6 shows a highly simplified side view of the first carriage of the linear transport system.

FIG. 6 shows a very highly simplified side view of the first motor module 109 with the first carrier 127.

An unwound stator or coil core 203 may be clearly seen. The illustration selected in FIG. 6 also shows in each case a coil 601 around every second coil core 203.

A Hall sensor is arranged below each of the unwound coil cores 203.

According to the illustration shown in FIG. 6, a first Hall sensor 605, a second Hall sensor 607, a third Hall sensor 609 and a fourth Hall sensor 611 are shown.

In one embodiment, more or fewer than these four Hall sensors are provided.

It is not necessary for a separate Hall sensor to be located under each unwound coil core 203. By way of example, it is sufficient for the linear transport system to comprise a total of four Hall sensors, each of which is arranged under an unwound coil core 203. It should be noted at this juncture that at least 1 Hall sensor is already sufficient.

A distance between two Hall sensors is for example a length of a carrier in the direction of travel. With reference to FIG. 6, for example, the first Hall sensor 605 and the fourth Hall sensor 611 are sufficient for the identification.

When the carriage travels via these Hall sensors 605 to 611, they detect the magnetic field of the corresponding magnetic field generator, as a result of which it is then possible to identify the corresponding carriage.

When using Hall sensors, this is also possible when the corresponding carriage is not moving, that is to say is stationary.

According to one embodiment, there is provision for the magnetic field of the corresponding magnetic field generator to be measured by way of the Hall sensors and stored as a reference.

During operation of the linear transport system, a currently measured magnetic field may then be compared with the pre-stored reference values such that, based on this comparison, the carriage associated with the corresponding magnetic field is able to be identified either as the first carriage 103 or as the second carriage 123.

The reference numeral 603 denotes a double-headed arrow, which indicates a possible direction of movement of the carriage.

A distance 613, represented symbolically by a double-headed arrow, between two Hall sensors is for example between 10 mm and 20 mm, in particular 16.6 mm. This distance 613 is predefined in particular by a distance between the coil cores 203.

The Hall sensors are therefore preferably arranged under the unwound coil cores 203, since more installation space is available here in comparison with the wound coil cores. This thus means that the Hall sensors are able to be arranged closer to the drive magnets of the carriages in comparison with the wound coils 601.

In one embodiment of the linear transport system 101, there is provision for the first and/or the second magnetic field generator to be different from the first or second rotor of the first or second carriage 103, 123. This means for example that the first carriage 103, in addition to the first rotor, has a first magnetic field generator that is not used to drive the first carriage 103. The first magnetic field generator is thus provided for example in addition to the drive magnets of the first carriage 103.

This means for example that the second carriage 123, in addition to the second rotor, has a second magnetic field generator that is not used to drive the second carriage 123. The second magnetic field generator is thus provided for example in addition to the drive magnets of the second carriage 123.

According to one embodiment, a carriage that has an additional magnetic field generator in addition to its drive magnets is identified by way of a magnetic field measurement of the magnetic field generated by way of the additional magnetic field generator using one or more Hall sensors.

Figure 7:
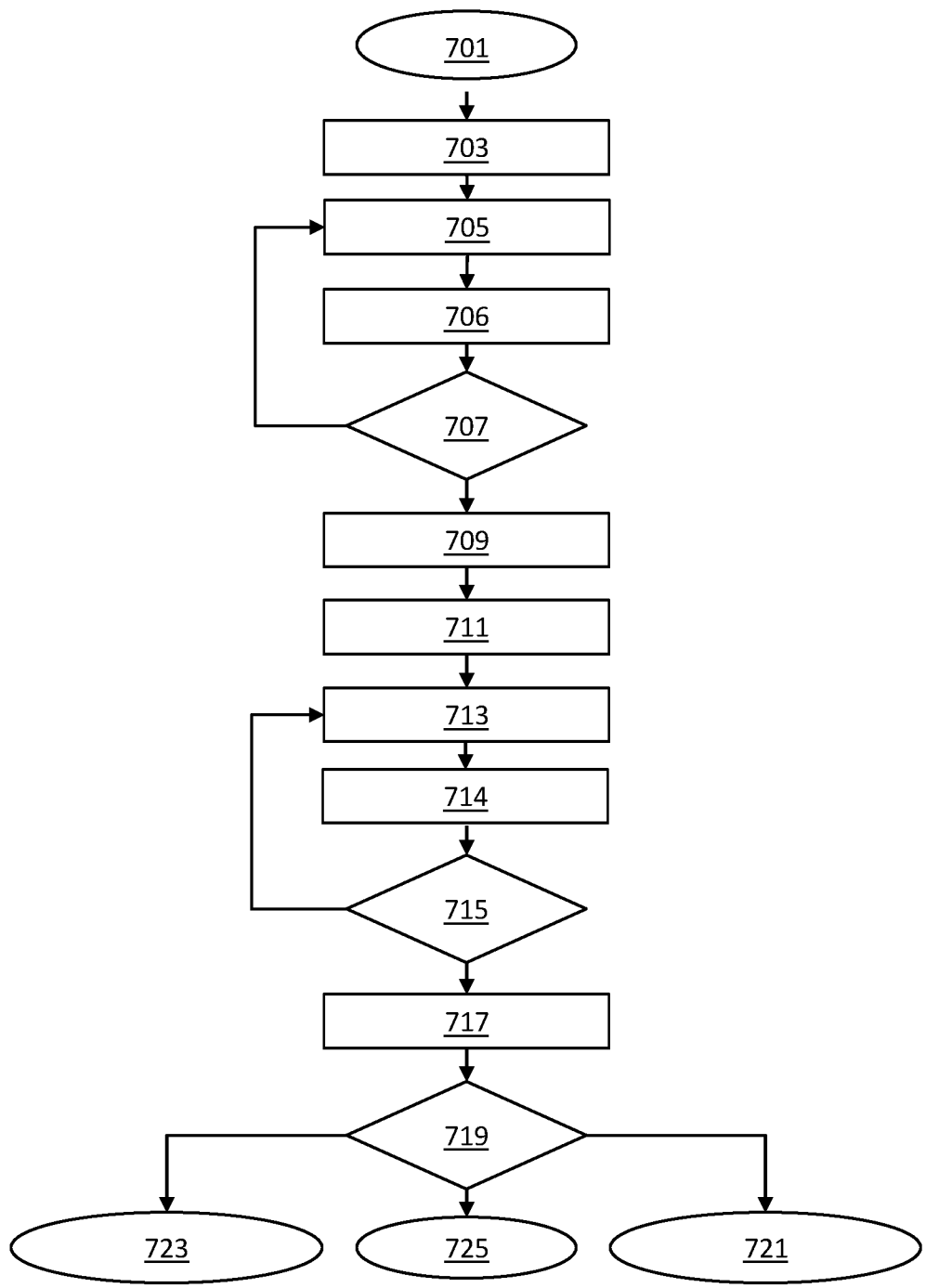
FIG. 7 shows a flowchart of a first method for identifying a carriage of a linear transport system.

FIG. 7 shows a flowchart of a first method for identifying a carriage of the linear transport system 101.

The method starts with a first step 701.

In a second step 703, a first position signal is received, this representing a first position of one of the two carriages 103, 123. The first and also the following position signals may be provided for example by way of the position detection system, which determines a current position of the carriages. The first position may also be referred to as a starting position.

After reception of the first position signal, in a third step 705, a first current vector control signal for distributing at least one first current vector via the drive coils of the linear transport system 101 based on a first commutation rule is applied in order to drive the carriage located at the first position.

Based on the output first current vector control signal, the drive coils are energized accordingly so as to drive the carriage.

The fourth step 706 furthermore comprises receiving a second position signal, wherein the second position signal represents a position of the driven carriage after the first current vector control signal has been output.

In a fifth step 707, it is checked, based on the first position signal and the second position signal, whether the carriage has moved away from the first position by a pre-determined minimum distance.

If the check in the fifth step 707 revealed that the carriage has not yet moved away from the first position by at least the minimum distance, the method is continued in the third step 705. There is then provision here for example to increase an instantaneous amplitude of the first current vector control signal.

If the check in the fifth step 707 revealed that the carriage has moved away from the first position by at least the predetermined minimum distance, there is provision in a sixth step 709 to store a current position of the carriage, which corresponds to the position of the carriage at the end of the fifth step 707.

In one embodiment, in addition to or instead of storing the position, there may be provision for a movement value corresponding to the movement of the carriage and corresponding to the difference between the starting position and the current position at the end of the fifth step 707 to be stored.

In a seventh step 711, there is provision to wait until the carriage has stopped. This may be ascertained based on the reception of further second position signals. The second position signal, corresponding to the stopping position of the carriage, is stored for later identification of the carriage.

In an eighth step 713, a second current vector control signal for distributing at least one second current vector via the drive coils based on the first commutation rule is also output in order to drive the carriage located at the stopping position. The second current vector is in this case opposite to the first current vector. This means that the second current vector points in the opposite direction with respect to the first current vector.

If for example a positive setpoint current is thus output based on the first current vector, in the eighth step 713, there is provision for a negative setpoint current to be output based on the second current vector (or vice versa), this for example not differing from the positive setpoint current, apart from the mathematical sign.

This thus means that the carriage is now driven in the opposite direction of travel.

In a ninth step 714, a third position signal is furthermore received, this representing a position of the carriage after the second current vector control signal has been output.

In a tenth step 715, in the same way as the fifth step 707, it is checked, based on the third position signal, whether the carriage has moved from the stopping position in the opposite direction of travel by the predefined minimum distance.

If the tenth step 715 revealed that the carriage has not yet moved in the opposite direction of travel by the pre-determined minimum distance, the method is continued in the eighth step 713. There is then provision here for example to increase an instantaneous amplitude of the second current vector control signal.

If the check in the tenth step 715 revealed that the carriage has moved away from the stopping position by at least the predetermined minimum distance, there is provision in an eleventh step 717 for a current position of the carriage, which corresponds to the position of the carriage at the end of the tenth step 715, to be stored.

In one embodiment, in addition to or instead of storing the position, there may be provision for a movement value corresponding to the movement of the carriage and corresponding to the difference between the position at the end of the fifth step 707 and the current position at the end of the tenth step 715 to be stored.

This thus means that the carriage is moved in the first direction of travel based on the first current vector control signal until it has traveled a predetermined minimum distance. The carriage is then driven in the opposite direction, the second direction of travel, until it has again traveled a predetermined minimum distance.

In a twelfth step 719, reference values or expected values are then read from the controller, these defining which carriage moves in which direction with a positive and negative setpoint current.

Based on these read reference values, it is then possible to perform a comparison between the above-described received second and third position signals with the corresponding energization in order to ascertain whether the carriage that started from the first position is the first or the second carriage.

The carriage may therefore thus be identified as the first or as the second carriage.

Accordingly, depending on a result of the check in the twelfth step 719, there is then provision to output a first identification signal 721 that represents identification of the carriage as the first carriage, or a second identification signal 723 that represents identification of the carriage as the second carriage is output.

If however the comparison in the twelfth step 719 revealed for example that the movements with the different energizations did not have different mathematical signs, an error signal 725 is output.

In one embodiment of the method described with regard to FIG. 7, the eighth step 713 to eleventh step 717 may be dispensed with and the second position signal ascertained in the fourth step 706 is compared directly with a read reference value in the twelfth step 719. Accordingly, depending on a result of the check in the twelfth step 719, there is then provision to output a first identification signal 721 that represents identification of the carriage as the first carriage, or a second identification signal 723 that represents identification of the carriage as the second carriage is output.

In a further embodiment of the method described with regard to FIG. 7, in the twelfth step 719, it is possible to dispense with reading reference values or expected values from a controller, these defining which carriage moves in which direction with a positive and negative setpoint current. In the twelfth step 719, only a comparison between the second position signal ascertained in the fourth step 706 and the third position signal ascertained in the ninth step 714 is then performed. One of the second or third position signals is then associated with a first carriage and a first identification signal 721 is accordingly output, this representing identification of the carriage as the first carriage. The other of the second or third position signals is then associated with a second carriage and a second identification signal 723 is accordingly output, this representing identification of the carriage as the second carriage.

In such a simplified method, any distinction is drawn between the carriages as first carriage or second carriage. This may however be entirely sufficient for some practical applications. If for example a plurality of carriages are operated in a transport system and only one carriage has a magnetic field generator different from the other carriages, then only the second position signal of this carriage will have a different directional mathematical sign in relation to the movement performed after having run through said method steps, since all of the other carriages were moved in a different direction. The first identification signal 721 may thus be associated with this one carriage, and the second identification signal 723 may be associated with all of the other carriages and output accordingly.

In the case of methods based on the method shown in FIG. 7, a position detection system for detecting the position of the carriages is therefore necessarily provided in order to detect the corresponding positions of the carriages.

Any combination of the embodiments described above is also conceivable and may be implemented easily by a person skilled in the art.

Figure 8:
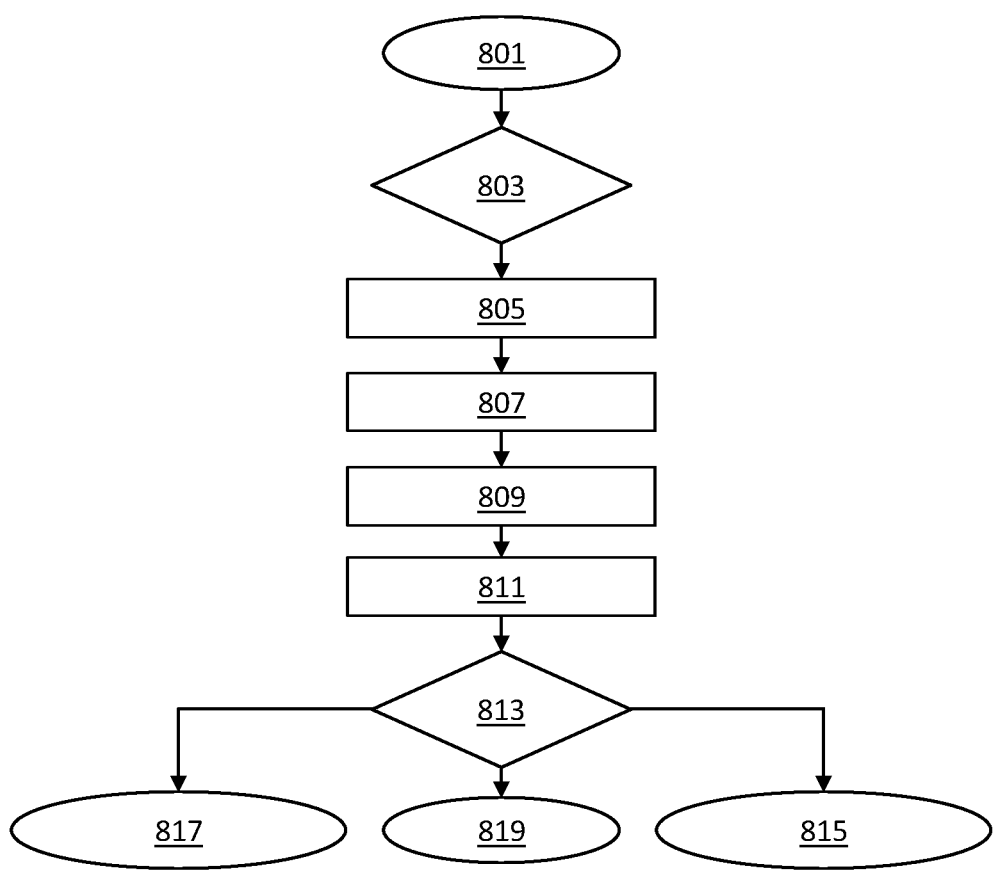
FIG. 8 shows a flowchart of a second method for identifying a carriage of a linear transport system.

FIG. 8 shows a flowchart of a second method for identifying a carriage of the linear transport system 101.

The method starts with the first step 801.

In a second step 803, there is provision to receive a position signal that represents a current position of one of the two carriages.

Depending on the current position of the carriage, one of the drive coils is selected and is used for a saturation measurement. By way of example, there is provision for that one of the drive coils that is most saturated by a drive magnet to be used or selected.

In a third step 805, a first setpoint current control signal for energizing the selected drive coil with a first setpoint AC current is output in order to energize the selected drive coil with the first setpoint AC current.

The third step 805 furthermore comprises receiving a first voltage measurement signal that represents a derived coil voltage of the drive coil energized with the first setpoint AC current after the first setpoint current control signal has been output.

In a fourth step 807, there is then provision for a second setpoint current control signal for energizing the selected drive coil with a first setpoint DC current to be output, wherein the fourth step 807 furthermore comprises receiving a second voltage measurement signal that represents a derived coil voltage of the drive coil energized with the first setpoint DC current after the second setpoint current control signal has been output.

The fourth step 807 may also be performed before the third step 805.

Based on the voltage measurement with DC current applied to the selected drive coil, the inductive voltage component of the voltage value with applied setpoint AC current is then calculated in a fifth step 809.

Accordingly, in the fifth step 809, there is provision for the coil voltage measured in the case of energization with the setpoint AC current to be corrected for this resistive voltage component, that is to say for this to be subtracted.

In a sixth step 811, there is furthermore provision for a positive and a negative peak value of the coil voltage of the drive coil to be calculated based on the corrected coil voltage.

Depending on the corresponding magnetic field of the corresponding magnetic field generator of the corresponding carriage, the energized drive coil will either go further into saturation or come out of saturation, which influences the inductance of the drive coil, which in turn may be measured via the coil voltage.

In this case too, it was ascertained in advance as part of a reference measurement which of the carriages generated which voltage measurement signal in the saturation measurement, wherein these measurement values were saved as reference values and stored in a controller.

In a seventh step 813, there is then provision for these pre-stored reference values to be retrieved or read and compared with the measured values in order to identify the carriage as the first carriage or as the second carriage. A first identification signal 815 that represents identification of the carriage as the first carriage is accordingly output. Or a second identification signal 817 that represents identification of the carriage as the second carriage is output.

If the comparison in the seventh step 813 has not revealed a clear answer or a clear result, an error signal 819 is output.

In a further embodiment, the position of the carriages is also ascertained or determined in this way, such that advantageously for example a separate position detection system for detecting the position of the carriages does not have to be used for the identification, or separate Hall sensors do not have to be provided. It is thus possible to implement for example a sensor-free (with regard to the identification) method.

For efficient identification in such a sensor-free method, there is for example provision for the distances between the drive coils and the distances between the drive magnets to be set such that there are no positions for one of the two carriages at which the magnetic field generator of one carriage puts a drive coil into saturation when the one carriage is moved in a specific direction, wherein the magnetic field generator of the other of the two carriages puts exactly this drive coil into saturation at another position of the other carriage when the other carriage is moved in exactly the same specific direction.

In one embodiment of the method described with regard to FIG. 8, the fourth step 807 and the ninth step 809 may be dispensed with, and the first voltage measurement signal ascertained in the third step 805 is compared directly with a read reference value in the seventh step 813. Accordingly, depending on a result of the check in the seventh step 813, there is then provision to output a first identification signal 815 that represents identification of the carriage as the first carriage, or a second identification signal 817 that represents identification of the carriage as the second carriage is output.

In a further embodiment of the method described with regard to FIG. 8, in the seventh step 813, the reading of reference values or expected values from a controller may be dispensed with. In the seventh step 813, only a comparison between the voltage measurement signal ascertained in the third step 805 and the second voltage measurement signal ascertained in the fourth step 807 is then performed. One of the first or second voltage measurement signals is then associated with a first carriage and a first identification signal 815 is accordingly output, this representing identification of the carriage as the first carriage. The other of the first or second voltage measurement signals is then associated with a second carriage and a second identification signal 817 is accordingly output, this representing identification of the carriage as the second carriage.

In such a simplified method, any distinction is drawn between the carriages as first carriage or second carriage. This may however be entirely sufficient for some practical applications. If for example a plurality of carriages are operated in a transport system and only one carriage has a magnetic field generator different from the other carriages, then only the first voltage measurement signal of this carriage will be different from the voltage measurement signals of the other carriages after running through said method steps. The first identification signal 815 may thus be associated with this one carriage, and the second identification signal 817 may be associated with all of the other carriages and output accordingly.

In a further embodiment of the method according to the invention, the ascertainment of the first position signal in the second step 803 may be dispensed with. In the third step 805, a first setpoint current control signal for energizing all of the drive coils located in the transport system 101 with a first setpoint AC current is then output in order to energize all of the drive coils with the first setpoint AC current. All further method steps then follow as described above.

Any combination of the embodiments described above is also conceivable and may be implemented easily by a person skilled in the art.

In the case of methods based on the method shown in FIG. 8, the use of a position detection system for identifying the carriages may for example be dispensed with, provided that the corresponding positions of the carriages do not necessarily have to be detected separately here. By way of example, it is thus possible to energize all of the drive coils using the method and to identify the carriages on the basis of the saturation pattern or the saturation behavior of the drive coils, and thereby also to ascertain their position.

Figure 9:
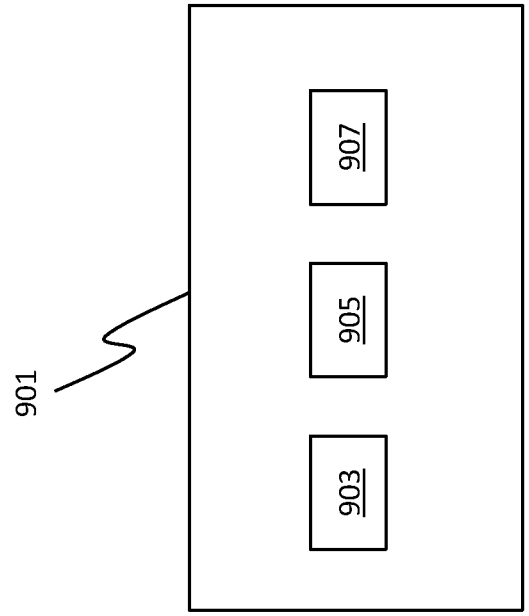
FIG. 9 shows a device that is designed to carry out all of the steps of the method for identifying a carriage of a linear transport system.

FIG. 9 shows a device 901 that is designed to carry out all of the steps of the method for identifying a carriage in a linear transport system according to the first and/or according to the second aspect.

The device 901 comprises an input 903 that is designed to receive at least one first measurement signal associated with one of the two carriages, this first measurement signal being based on a first measurement that depends on the magnetic field of the magnetic field generator of one of the two carriages.

The device 901 furthermore comprises a processor 905 that is designed to identify the carriage associated with the first measurement signal as the first carriage or as the second carriage based on the at least one first measurement signal.

The device 901 comprises an output 907 that is designed to output a first or second identification signal that represents identification of the carriage associated with the first measurement signal as the first or the second carriage.

In one embodiment, a plurality of processors are provided instead of one processor 905.

According to a further embodiment, the input 903 comprises a first communication interface that is designed to receive signals, for example measurement signals, via a communication network.

According to one embodiment, the communication network comprises an EtherCAT communication network.

According to a further embodiment, the output 907 comprises a second communication interface that is designed to output signals, for example identification signals and/or control signals, via the communication network.

In another embodiment, the device 901 comprises a communication interface that combines the functionalities of the first communication interface and the second communication interface.

Figure 10:
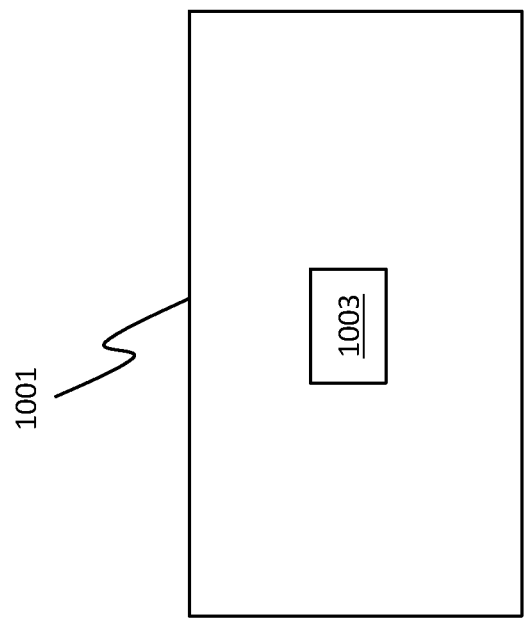
FIG. 10 shows a machine-readable storage medium.

FIG. 10 shows a machine-readable storage medium 1001.

A computer program 1003 is stored on the machine-readable storage medium 1001 and comprises instructions that, when the computer program 1003 is executed by a computer, for example by the device 901 from FIG. 9, prompt same to carry out a method for identifying a carriage of a linear transport system.

In summary, the concept described here is based inter alia on the fact that magnetic field generators are arranged on carriages of a linear transport system, these magnetic field generators generating partially different magnetic fields, such that the corresponding magnetic field generators differ at least in terms of their magnetic vector field.

These different magnetic vector fields thus form a respective magnetic identification means by way of which the individual carriages of the linear transport system are able to be identified efficiently.

In one embodiment, there is provision for the magnetic field generator to be part of the rotor. By way of example, the drive magnets of the carriages are used to identify said carriages.

In one embodiment, there is provision for these magnets not to be the drive magnets, but rather to be additional magnets that are arranged on the carriage in addition to the drive magnets, that is to say in addition to the rotor. These additional magnets may for example also perform other tasks. By way of example, these additional magnets may also be used for position detection.

In one embodiment, there is provision for the correspondingly generated magnetic field to be measured by way of one or by way of a plurality of Hall sensors. This measured magnetic field is compared for example with a reference magnetic field in order to identify the corresponding carriage as the first or as the second carriage.

If the magnetic field generators are part of the rotor, according to one embodiment, there is provision for the carriage to be identified based on its travel behavior. This is because, depending on the generated magnetic field, the carriages will behave differently with an identical current vector control signal. By way of example, one carriage moves in a first direction of travel and the second carriage moves in the opposite direction of travel, with respect to this direction of travel, when the same current vector is applied.

If the magnetic field generators are part of the rotor, according to one embodiment, there is provision for the carriages to be identified via a measurement of a direction-dependent inductance of a drive coil (the above saturation measurement).

The principle of saturation measurement is based on the fact that, when a drive coil is saturated, or more precisely the wound coil core of the drive coil is saturated, its inductance drops. This thus means that less voltage is required for a certain current change.

Thus, if the drive magnets of a carriage are above or at least partially above a drive coil, these drive magnets also put the corresponding drive coil, more precisely the wound coil core (stator core), into saturation.

A setpoint AC current, for example a sinusoidal setpoint AC current, is then predefined and applied to the drive coil, wherein the coil voltage corresponding to this setpoint AC current is derived. If the applied setpoint AC current saturates the drive coil further in one direction, the coil voltage in this direction becomes lower in comparison with the opposite case when the coil is brought out of saturation with the opposite setpoint AC current and its inductance increases.

Depending on the generated magnetic field of the magnetic field generator, the drive coil is thus put further into saturation or is brought out of saturation, which may then be ascertained by measuring the coil voltage present at the drive coil.

The wording whereby a drive coil is put into saturation means or represents the fact that the coil core (stator core) wound around by way of the drive coil is put into saturation.

In this case too, there is for example provision for a reference saturation measurement to be performed for the first and for the second carriage in order to store the corresponding coil voltages as reference measurement values. These stored measurement values may then be read later during operation of the linear transport system and compared with the then current measurement values in order to identify the corresponding carriage as the first or as the second carriage.

In the case of the measurement during operation and/or during the reference saturation measurement, in one embodiment, there is provision for example for a setpoint DC current, for example a setpoint DC current of 3 A, to be applied to the drive coil. The coil voltage then present at the drive coil is independent of the inductance of the coil, such that a resistive voltage component is thereby able to be ascertained, this being able to be subtracted from the voltage measurement signal in the case of energization with the setpoint AC current.

It is thereby possible to draw an even clearer distinction between the measurement curves, associated with the two carriages, of the coil voltages, which enables efficient identification.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A method for identifying a carriage of a linear transport system,
    wherein the linear transport system has a first carriage, a second carriage, a controller and a linear motor for driving the first and the second carriage,
    wherein the linear motor comprises a stator having at least two drive coils and comprises a first and a second rotor, wherein the first rotor is arranged on the first carriage and the second rotor is arranged on the second carriage,
    wherein the first carriage has a first magnetic field generator that is configured to generate a first magnetic field, and the second carriage has a second magnetic field generator that is configured to generate a second magnetic field,
    wherein the first magnetic field generator has a plurality of magnets and the second magnetic field generator has a plurality of magnets,
    wherein the magnets of the first magnetic field generator and the magnets of the second magnetic field generator are oriented in each case alternately with the south pole and the north pole facing the motor modules, and
    wherein the first magnetic field generator differs from the second magnetic field generator at least in terms of its magnetic vector field, in which the pole orientation of the magnets of the first magnetic field generator of the first carriage is exactly opposite the pole orientation of the magnets of the second magnetic field generator of the second carriage;
  the method comprising the following steps:
    applying a first control signal to the stator having at least two drive coils, this control signal triggering a first measurement that depends on the magnetic vector field of the magnetic field generators of the two carriages;
    receiving at least one first measurement signal associated with one of the two carriages, which measurement signal is based on the first measurement;
    identifying the carriage associated with the first measurement signal as the first carriage or as the second carriage based on the at least the first measurement signal, wherein at least one reference value is stored in the controller and is associated with one of the two carriages, wherein the identification of the carriage is based on a comparison between the first measurement signal and the at least one reference value; and
    outputting a first or a second identification signal that represents an identification of the carriage associated with the first measurement signal as the first or the second carriage.

2. The method as claimed in claim 1, wherein a second control signal is applied to the stator having at least two drive coils, this triggering a second measurement that depends on the magnetic vector field of the magnetic field generators of the two carriages, wherein a second measurement signal that is based on the second measurement is received.

3. A method for identifying a carriage of a linear transport system,
    wherein the linear transport system has a first carriage, a second carriage, a controller and a linear motor for driving the first and the second carriage,
    wherein the linear motor comprises a stator having at least two drive coils and comprises a first and a second rotor, wherein the first rotor is arranged on the first carriage and the second rotor is arranged on the second carriage,
    wherein the first carriage has a first magnetic field generator that is configured to generate a first magnetic field, and the second carriage has a second magnetic field generator that is configured to generate a second magnetic field, and
    wherein the first magnetic field generator differs from the second magnetic field generator at least in terms of its magnetic vector field;
  the method comprising the following steps:
    applying a first control signal to the stator having at least two drive coils, this control signal triggering a first measurement that depends on the magnetic vector field of the magnetic field generators of the two carriages;
    receiving at least one first measurement signal associated with one of the two carriages, which measurement signal is based on the first measurement;
    identifying the carriage associated with the first measurement signal as the first carriage or as the second carriage based on the at least the first measurement signal, wherein at least one reference value is stored in the controller and is associated with one of the two carriages, wherein the identification of the carriage is based on a comparison between the first measurement signal and the at least one reference value; and outputting a first or a second identification signal that represents an identification of the carriage associated with the first measurement signal as the first or the second carriage;

the method further comprising the following steps:

receiving a first position signal that represents a first position of one of the two carriages, after receiving the first position signal, outputting at least one first current vector control signal for distributing at least one first current vector via the drive coils based on a first commutation rule to the stator having at least two drive coils as first control signal, in order to drive the carriage located at the first position, and receiving as the first measurement signal comprises a second position signal, wherein the second position signal represents at least one position of the carriage driven based on the output first current vector control signal after the first current vector control signal has been output, wherein a first kinematic behavior of the carriage is ascertained based on the first position signal and on the second position signal after the first current vector control signal has been output, wherein the carriage is identified as the first or as the second carriage based on the ascertained kinematic travel behavior.

4. The method as claimed in claim 3, wherein a first current vector control signal for distributing at least one second current vector via the drive coils based on the first commutation rule to the stator having at least two drive coils as second control signal in order to drive the carriage located at the second position comprises receiving a third position signal as the second measurement signal, wherein the third position signal represents at least one position of the carriage driven based on the output second current vector control signal after the second current vector control signal has been output, wherein a second kinematic behavior of the carriage is ascertained based on the second position signal and on the third position signal after the second current vector control signal has been output, and wherein the carriage is identified as the first or as the second carriage based on the ascertained first and second kinematic travel behavior.

5. A method for identifying a carriage of a linear transport system, wherein the linear transport system has a first carriage, a second carriage, a controller and a linear motor for driving the first and the second carriage, wherein the linear motor comprises a stator having at least two drive coils and comprises a first and a second rotor, wherein the first rotor is arranged on the first carriage and the second rotor is arranged on the second carriage, wherein the first carriage has a first magnetic field generator that is configured to generate a first magnetic field, and the second carriage has a second magnetic field generator that is configured to generate a second magnetic field, and wherein the first magnetic field generator differs from the second magnetic field generator at least in terms of its magnetic vector field;

the method comprising the following steps:

applying a first control signal to the stator having at least two drive coils, this control signal triggering a first measurement that depends on the magnetic vector field of the magnetic field generators of the two carriages;

receiving at least one first measurement signal associated with one of the two carriages, which measurement signal is based on the first measurement;

identifying the carriage associated with the first measurement signal as the first carriage or as the second carriage based on the at least the first measurement signal, wherein at least one reference value is stored in the controller and is associated with one of the two carriages, wherein the identification of the carriage is based on a comparison between the first measurement signal and the at least one reference value; and outputting a first or a second identification signal that represents an identification of the carriage associated with the first measurement signal as the first or the second carriage;

the method further comprising the following steps:

when one of the two carriages is in a saturation position in relation to one of the drive coils, in which the magnetic field of the corresponding magnetic field generator puts a coil core of one drive coil into saturation, outputting a first setpoint current control signal for energizing the one drive coil with a first setpoint AC current to the stator having at least two drive coils as first control signal, wherein the first measurement signal comprises a first voltage measurement signal that represents a derived coil voltage of the drive coil energized with the first setpoint AC current after the first setpoint current control signal has been output.

6. The method as claimed in claim 4, wherein a second setpoint current control signal for energizing the one drive coil with a first setpoint DC current is output to the stator having at least two drive coils as second control signal, wherein a second voltage measurement signal is received as the second measurement signal, this representing a derived coil voltage of the drive coil energized with the first setpoint DC current after the second setpoint current control signal has been output, wherein an inductive voltage component of the measured coil voltage of the first voltage measurement signal is calculated based on the second voltage measurement signal, wherein the resistive voltage component is subtracted from the measured coil voltage of the first voltage measurement signal in order to ascertain a coil voltage corrected for the resistive voltage component, and wherein the carriage associated with the first measurement signal is identified as the first carriage or as the second carriage based on the ascertained corrected coil voltage.

7. A linear transport system, comprising:

a first carriage and a second carriage, a linear motor for driving the first carriage and the second carriage, and a guide rail, wherein the linear motor comprises a stator and a first and a second rotor, wherein the stator has a plurality of drive coils that are arranged along the guide rail individual motor modules comprise a plurality of drive coils, wherein the first rotor is arranged on the first carriage and the second rotor is arranged on the second carriage, wherein the first carriage has a first magnetic field generator, wherein the second carriage has a second magnetic field generator, wherein the first magnetic field generator has a plurality of magnets oriented along the guide rail and is configured to generate the first magnetic field, and the second carriage has a second magnetic field generator that has a plurality of magnets oriented along the guide rail and is configured to generate the second magnetic field, wherein the magnets of the first magnetic field generator and the magnets of the second magnetic field generator are oriented in each case alternately with the south pole and the north pole facing the motor modules, wherein the first magnetic field generator differs from the second magnetic field generator at least in terms of its magnetic vector field, in which the pole orientation of the magnets of the first magnetic field generator of the first carriage is exactly opposite the pole orientation of the magnets of the second magnetic field generator of the second carriage with regard to the orientation toward the motor modules, such that, when the magnetic field generators are considered in the case of first and second carriages placed on the guide rail, the south pole of the first magnet of one magnetic field generator and the north pole of the first magnet of the other magnetic field generator are oriented facing the motor modules, and wherein the magnetic fields of the magnetic field generators are detected to identify the corresponding carriage.

8. The linear transport system as claimed in claim 7, further comprising a plurality of Hall sensors, wherein the plurality of Hall sensors is arranged along the guide rail and is constructed to detect the magnetic fields of the magnetic field generators to identify the corresponding carriage.

9. The linear transport system as claimed in claim 7, wherein the currently measured magnetic field is compared with a pre-stored reference value such that, based on this comparison, the carriage associated with the corresponding magnetic field is configured to be identified either as the first carriage or as the second carriage.

10. A linear transport system comprising
a first carriage,
a second carriage,
a guide rail, and
a linear motor for driving the first and the second carriage along the guide rail,
wherein the linear motor comprises a stator and a first and a second rotor,
wherein the stator has motor modules that are arranged along the guide rail and each comprise drive coils,
wherein the first rotor is arranged on the first carriage and the second rotor is arranged on the second carriage,
wherein the first carriage has a first magnetic field generator that has a plurality of magnets oriented along the guide rail and is configured to generate a first magnetic field,
wherein the second carriage has a second magnetic field generator that has a plurality of magnets oriented along the guide rail and is configured to generate a second magnetic field,
wherein the magnets of the first magnetic field generator and the magnets of the second magnetic field generator are oriented in each case alternately with the south pole and the north pole facing the motor modules,
wherein the first magnetic field generator differs from the second magnetic field generator at least in terms of its magnetic vector field, in which the pole orientation of the magnets of the first magnetic field generator of the first carriage is exactly opposite the pole orientation of the magnets of the second magnetic field generator of the second carriage with regard to the orientation toward the motor modules, such that, when the magnetic field generators are considered in the case of first and second carriages placed on the guide rail, the south pole of the first magnet of one magnetic field generator and the north pole of the first magnet of the other magnetic field generator are oriented facing the motor modules, wherein a first control signal is applied to the stator, this first control signal triggering a first measurement that depends on the magnetic vector field of the magnetic field generators of the two carriages, wherein at least one first measurement signal associated with one of the two carriages is received, which first measurement signal is based on the first measurement, wherein the carriage associated with the first measurement signal is identified as the first carriage or as the second carriage based on the at least the first measurement signal, wherein at least one reference value is associated with one of the two carriages, wherein the identification of the carriage is based on a comparison between the first measurement signal and the at least one reference value, and a first or a second identification signal is outputted that represents an identification of the carriage associated with the first measurement signal as the first or the second carriage.

11. The linear transport system as claimed in claim 10, wherein a second control signal is applied to the stator, this triggering a second measurement that depends on the magnetic vector field of the magnetic field generators of the two carriages, wherein a second measurement signal that is based on the second measurement is received.

12. The linear transport system as claimed in claim 10,
wherein a first position signal is received that represents a first position of one of the two carriages,
wherein, after receiving the first position signal, at least one first current vector control signal for distributing at least one first current vector via the drive coils is outputted based on a first commutation rule to the stator as first control signal, in order to drive the carriage located at the first position,
wherein as the first measurement signal a second position signal is received, wherein the second position signal represents at least one position of the carriage driven based on the output first current vector control signal after the first current vector control signal has been output,
wherein a first kinematic behavior of the carriage is ascertained based on the first position signal and on the second position signal after the first current vector control signal has been output, and
wherein the carriage is identified as the first or as the second carriage based on the ascertained kinematic travel behavior.

13. The linear transport system as claimed in claim 12,
wherein a first current vector control signal for distributing at least one second current vector via the drive coils based on the first commutation rule to the stator as second control signal in order to drive the carriage located at the second position comprises is received a third position signal as the second measurement signal, wherein the third position signal represents at least one position of the carriage driven based on the output second current vector control signal after the second current vector control signal has been output, wherein a second kinematic behavior of the carriage is ascertained based on the second position signal and on the third position signal after the second current vector control signal has been output, and wherein the carriage is identified as the first or as the second carriage based on the ascertained first and second kinematic travel behavior.

14. The linear transport system as claimed in claim 10, wherein the first and the second magnetic field generator are each part of the rotor of the carriage.

* * * * *